Patented July 3, 1951

2,559,498

UNITED STATES PATENT OFFICE 2,559,498

PROCESS FOR PREPARING RESINS FROM DIISOBUTYLENE AND CRACKED PETROLEUM CONDENSATE

John D. Garber, Cranford, William J. Sparks, Westfield, and David W. Young, Roselle, N. J., assignors to Standard Oil Development Company, a corporation of Delaware No Drawing. Application March 9, 1946, Serial No. 653,424

3 Claims. (Cl. 260—82)

This invention relates to co-polymers of mono-olefins and multiolefins, and relates particularly to a copolymer of mono-olefins such as di-isobutylene with mixed unsaturates; and relates especially to a process and product involving the copolymerization at moderately reduced temperatures of a mono-olefin with a fractionally distilled cut of crude, mixed, saturated and mono and poly unsaturated components from a high temperature hydrocarbon cracking process.

It has been found possible to prepare valuable resinous material by copolymerization of a multi-olefin such as butadiene, with an iso-olefin such as the octene obtained by dimerization of isobutylene, and it has been considered that a satisfactory process and a satisfactory product could be obtained only by the use of raw materials of relatively high purity; such as butadiene of from 96 to 98 per cent purity, and "dimer" of from 98 to 99 per cent purity.

It is now found, however, that by a fractional distillation of a particular by-product obtained by the cracking industry, and the utilization of certain broad distillation cuts, a high-grade of light-colored to water-white resin can be obtained from a raw material containing mixtures of a considerable number of multi-olefins with substantial proportions of mixed aliphatic saturates and mono-olefins.

This raw material is obtained from the so-called "Gyro" cracking process in which petroleum or other heavy hydrocarbon materials are cracked at relatively high temperatures (optimum cracking zone temperature about 1300° F.) to produce gasoline boiling-range hydrocarbons. At a stage in the process, the gaseous material is compressed, and the compressed gases cooled to room temperature. At this stage, a substantial quantity of pressure condensate occurs, which has been sold under the trade name of "Dripolene."

This compression condensate as received from the cracking process shows a specific gravity from 0.846 to 0.860; an Engler distillation with an initial boiling point at about 40° C., and a final boiling point at about 180° C. The material shows a bromine number usually within the range of 1,000 to 1,100 mgs. per cc.

A distillation on a representative sample of the material was made in a "Badger type" 20 plate distillating column operating upon a single batch and the distillate was segregated according to the temperature of distillation.

About 4.6% of the material was gas which boiled out and did not condense at room temperature. Within the range between room temperature and 50° C., approximately 12.1% boiled over. From 50 to 100° C., approximately 49.2% boiled over. From 100 to 125° C., approximately 11.5% boiled over. From 125 to 180° C., approximately 16.6% boiled over, leaving a residue of higher boiling material of approximately 6.15%. It may be noted that the 50 to 100° C. cut was mostly benzol, and the 100 to 125° C. cut was mostly toluol.

Of these six cuts, the gas portion is useless for the present process, since it is unduly difficult to recover. The 20° to 50° C. cut is highly suitable for the present process. The 50° to 100° C. cut and the 100° to 125° C. cuts are nearly useless for the present process since they are mainly benzol and toluol, which do not polymerize, and the amount of polymerizable material in these cuts is too small to be useful. The 125° to 185° C. cut also is highly useful for the present process and the residue is of no present use for the process because of the fact that it is in large part saturated, unpolymerizable material which is so difficult to strip from the finished resin that it is undesirable in the reaction.

The above-mentioned Engler distillation showed temperature and per cent distilled over according to the following table:

| Temperature | Per Cent Distilled |
|---|---|
| First Drop, 36° C. | |
| 40° | 3 |
| 45° | 5.5 |
| 50° | 9 |
| 60° | 15 |
| 70° | 22.5 |
| 80° | 37 |
| 90° | 52 |
| 100° | 65 |
| 110° | 71 |
| 120° | 73 |
| 130° | 75 |
| 140° | 77.5 |
| 150° | 80 |
| 160° | 84 |
| 170° | 89 |
| 175° | 93 |
| 180° | 97 |

According to the present invention, mixtures of these mixed multi-olefins with mono-olefins are prepared and polymerized. The preferred mono-olefin is the octene known as "dimer," prepared from isobutylene, because of the present commercial availability and low price. However, the process is equally useful with other mono-olefins such as pentene, both normal and iso, all the hexenes, all the heptenes, all the octenes, and nonenes, and the like; any organic compound having from 5 to about 20 carbon atoms per molecule and one double bond being useful.

One or more of these mono-olefins are mixed in substantial proportion to major proportion with the selected cuts from the cracking coil by-product and polymerized at temperatures within the range between about +10° C. and about −30° C. to yield the desired copolymerizate resin.

Thus, the process of the invention mixes together a selected fraction of an olefinic cracking coil recovery product with a mono-olefin and polymerizes the resulting mixture at moderately reduced temperature by the use of a Friedel-Crafts type catalyst to yield a new resin which is particularly useful for paint and varnish base material and for moldable compositions.

The resulting resin is not only valuable in paint but is valuable as a molding composition either alone or in the presence of added fillers, flexibilizers, reinforcers, and the like. It is also valuable in admixture with mineral oil, wax, asphalt, simple polyisobutylene; various elastomers including caoutchouc (natural rubber), polymerized butadiene, alone or copolymerized with styrene or acrylonitrile, the isobutylene-diolefin low temperature copolymer known as butyl and a wide range of similar substances including substantially all of the commercially available molding resins and paint or varnish components.

Other objects and details of the invention will be apparent from the following description:

In practicing the invention a mixture is prepared of the desired mono-olefin and either or both of the first and fourth distillation cuts above described. The preferred preparation consists of from approximately 60% of the olefin with approximately 40% of one or both of the preferred cuts 1 and 4, as above described, to approximately 5% of the mono-olefin with 95% of the cuts above indicated. This mixture may be used as prepared, or may be diluted with any one or more of a wide range of diluents. A preferred diluent is methyl chloride, which is representative of any of the mono or poly halogen substituted aliphatics having boiling points below about 0° C. Such substances as ethyl chloride, dichlor methane, chloroform, ethylene dichloride and the like are also particularly suitable. Alternatively, the various lower-boiling hydrocarbons may be used. For this purpose, propane is particularly useful. Butane is also useful in some instances, as are both ethane or ethylene, although these latter two may yield lower temperatures than is desirable.

The material is then cooled to a temperature within the range between about +10° to about −30°; the preferred temperature range being between about 0° C. and about −20° C. This cooling is conveniently obtained by the application of a refrigerating jacket to the reactor and, if desired, to the storage or mixing containers in which the olefinic material is stored and mixed. It is usually desirable to add to the mixture a small proportion of one of the lower-boiling hydrocarbons, for which purpose propane is particularly suitable; and to equip the reactor with a strongly cooled reflux condenser, using for a refrigerant such substances as liquid ethylene, liquid ethane, carbon dioxide, either liquid or solid, or any of the ordinary refrigerants, including ammonia, propane, sulfur dioxide, the low-boiling fluorine substituted hydrocarbons and the like, all of which are equally useful in the refrigerating jackets.

A convenient procedure is to add to the olefinic material a sufficient quantity of liquid propane to bring the boiling point of the mixture down to the desired low temperature. The rapid return of vaporized propane as strongly cooled reflux from the condenser then maintains the temperature quite close to the desired value.

The material in the reactor is preferably very strongly stirred by a propeller stirrer which both agitates and circulates the reactor contents, and a propeller speed ranging from 200 to 1,500 R. P. M. is desirable, depending upon the size of the reactor. The polymerization is conducted by the application to the cold mixture of a Friedel-Crafts catalyst, preferably in solution.

The preferred catalyst is a Friedel-Crafts type substance such as aluminum chloride. However, any of the Friedel-Crafts catalysts disclosed by N. O. Calloway in his article on "the Friedel-Crafts Synthesis" printed in the issue of "Chemical Reviews" published for the American Chemical Society at Baltimore in 1935, in volume XVII, No. 3, the article beginning on page 327, the list being particularly well shown on page 375, may be used.

Of this list of catalysts, dissolved aluminum chloride is preferred, but boron trifluoride, especially in solution, is highly satisfactory. Titanium tetrachloride, either as such or in solution is also highly satisfactory. Of particular value are some of the mixed salts such as aluminum chlorobromide, or aluminum chloroethoxide and the like, which show a better solubility in the volatilizable solvents.

For the solvent, the preferred solvents are the mono or poly-halogen substituted aliphatic compounds having freezing points below about 0° C., thereby being low-freezing. It may be noted that these solvents are non-reactive with the aluminum chloride and form no complexes therewith. That is, they boil away completely from the solute with a merely nominal rise in boiling point of less than 2°, to leave behind a substantially pure aluminum salt. Accordingly, the catalyst solvent is characterized, for the purposes of this specification, as being "low-freezing" and "non-complex forming"; and, for the purposes of this specification, the phrase "alkyl halide" is defined as including any of the mono or poly-halogen substituted aliphatic compounds. Various other low-freezing, non-complex forming substances also are excellent catalyst solvents. Such substances as carbon disulfide, and the lower-boiling hydrocarbons (with a limited number of the catalysts), being particularly useful.

The catalyst solution is applied to the cold reaction mixture in any convenient manner, a preferred method being in the form of a fine high pressure jet into the body of the cold, rapidly-stirred aliphatic mixture. Alternatively, the catalyst may be added in the form of a fine spray on to the surface of the rapidly-stirred cold aliphatic material.

The polymerization reaction proceeds promptly after an induction period which may range from a very small fraction of a second to a considerable number of minutes, depending upon the catalyst chosen. The reaction likewise may be carried to, and halted at, any desired percentage stage of completion, merely by limiting the amount of catalyst used, and it is found that from 0.5 part to about 6 parts of catalyst by weight per 100 parts of polymerized aliphatic material is required.

The resulting dry polymer is not rubbery in type, but more nearly resembles a standard resin. It is hard, with a relatively very low elasticity. The Staudinger molecular weight number may range from 1,000 or 2,000 up to 10,000 or even 15,000, depending upon the olefinic compounds polymerized, the temperature of polymerization, and the type of catalyst used. There is, however, relatively little physical difference between the polymers of these different molecular weights, and the molecular weight is a minor characteristic. The iodine number, by the Wijs method, ranges between 50 and 200 depending upon the proportion of diolefin used and the amount of cross-linkage and jell formation which occurs during the polymerization reaction. The melting point of the resin usually lies between about room temperature and 140° C. (by the ball and ring method), depending upon the multi-olefin chosen, the temperature of polymerization, the catalyst used, and various other factors; in some instances, the melting point is determined to some extent by the amount of cross-linkage between the resin molecules.

The resin may be recovered from the polymerization mixture in any convenient manner. If the reaction is carried only to the stage of from 50 to 70 per cent yield, the reaction mixture at this stage is a thick, viscous, heavy solution. The reaction may, if desired, be halted by the addition of small amounts of an alcohol or alkali, although this usually is not necessary. Alternatively, the polymerization mixture may be dumped into warm water or warm naphtha, either of which volatilizes out the low boiling unsaturates and the diluents, refrigerants, catalyst solvents, etc. In water, a wet emulsion is formed which may be dried in any convenient way, as in a moderately warm oven, or on the mill. In warm naphtha, a solution is formed from which the polymer may conveniently be recovered by heating the solution in a steam-jacketed pipe and flashing off the solvent, allowing the molten resin to flow from the end of the flash pipe. This procedure is applicable to resins containing from 40% to 50% or 60% of the multiolefin; higher multi-olefin percentages yield a heat-setting resin which will not withstand this procedure, and, accordingly, the higher multi-olefin resins must be recovered by other processes.

The resulting resin is readily soluble in a wide range of oils, particularly the paint and varnish oils, such as linseed oil, tung oil, oiticica oil, soy bean oil, dehydrated castor oil and the like. In such oil solutions, the material may be cooked, as is customary with paint and varnish bases, and may then be colored or loaded with any desired paint or varnish colorant or pigment to yield a very valuable paint, varnish, or enamel. Alternatively, the resin may be mixed with appropriate fillers, such as pigment, wood flour, ground cork, cotton linters, fabrics, and the like to yield a very valuable molding composition.

*Example 1.*—A sample of the compression condensate from the high temperature cracking process above described was fractionally distilled, and the portion boiling between 20 and 50° C. was segregated as a separate cut. 550 parts by weight of this material were mixed with 200 parts by weight of di-isobutylene and sufficient liquid propane (700 parts) was added to bring the temperature down to about −13° F. (−25° C.). This reduction in temperature required approximately 700 parts by weight of the propane. The mixture was prepared in a polymerization reactor which was heat-insulated but not refrigerant-jacketed, but was equipped with a reflux condenser cooled by liquid ethylene. Approximately 430 parts by weight of a 3.5 per cent solution of aluminum chloride in ethyl chloride was then added in the form of a fine jet into the body of the reaction mixture at a rate of approximately 5.9 parts by weight per minute, and the reaction was continuing over a period of approximately 1¼ hrs., during which time the following log of the run was made:

*Log of run—Under reflux*

| Time | Temp., °F. | Ml. Cat. Added | Remarks |
|---|---|---|---|
| 2:15 | −13 | Added no cat | 700 ml. propane added under reflux condition. |
| 2:25 | −5.8 | 60 | No reflux. |
| 2:35 | −2.2 | 115 | Steady reflux. |
| 2:45 | −3.1 | 170 | Do. |
| 2:55 | −4.0 | 230 | Do. |
| 3:05 | −5.8 | 285 | Do. |
| 3:15 | −4.9 | 345 | Do. |
| 3:25 | −5.8 | 400 | Do. |
| 3:30 | −4.0 | 430 | Very viscous solution. |

At the close of the reaction, the solution was washed with 4,000 parts by weight of cold water which drove off the propane, the catalyst solvent, and some of the unpolymerized olefins. The resin formed a slurry in the water from which it was filtered and heated to 250° C. for 15 minutes. The yield was 46.1% by weight of the combined distillation cut and dimer. The resin was found to have a Staudinger molecular weight number of approximately 3,000; an iodine number of approximately 120 and a melting point of approximately 88° C.

The resin was found to be soluble in linseed oil and a mixture was cooked, at 15 gallon length at 292° C. for 4 hrs. The cook yielded an excellent varnish base which had a Gardner color of "8."

*Example 2.*—A polymerization mixture was prepared consisting of 18 parts by volume of the first cut from the pressure condensate as shown in the foregoing table (the part boiling between about 20° and 50° C.); with 52 parts by volume of methyl chloride at a temperature of approximately −24° C. This mixture was prepared in a reactor equipped with a reflux condenser, cooled by a liberal supply of liquid ethylene. To this mixture there was then added 37 parts by volume of the fourth cut, as shown in the above table; the portion boiling between 125° and 180° C. To this amount there was then added approximately 3.3 parts by volume of mixed amylenes. This mixture was then strongly stirred in the reactor and it was found to have a temperature of approximately −10° C. which was held at this point by a small amount of very cold reflux; sufficient to supply the refrigeration losses from the reactor. It may be noted that this procedure of reflux from a strongly cooled reflux condenser permits of the use of a very cold refrigerant, without the production of unduly low temperature nor undue temperature variations in the cold material but that instead the temperature is set by the mixed boiling point of the material, and only enough cooling is brought into the mixture to supply the heat losses since only as much cold reflux is returned as is provided by the amount of liquid boiled out. To this cold mixture at about −10° C. there was then added approximately 10 pounds of aluminum chloride per 100 gallons of cold mixture; the aluminum chloride being delivered in the form of a 3% solution in ethyl chloride. The catalyst was added at a leisurely rate, the total amount being added over a time of four hours. When the catalyst had been added, approximately one part by volume of high-grade isopropyl alcohol was added to the cold mixture to inactivate the catalyst. The polymer solution was then discharged into water at about room temperature, about equal parts of water and polymerization mixture being used. The stirred mixture was then heated to approximately 25° C. and wash water was decanted from the hydrocarbon-resin solution. The resin was then heated to 225° C. to evaporate out as much as possible of the unpolymerized olefins and as much as possible of residual ethyl and methyl chloride and saturates from the original mixture.

The resulting resin was a light yellow in color and the yield mounted to approximately 2.98 pounds of resin per gallon of mixed second and fourth cut and amylenes. The melting point by the ring and ball method was 72° C., the iodine number was 80 and the Staudinger molecular weight number 3000. The resin was found to be soluble in linseed oil.

A solution of resin in linseed oil at "15 gallon length" was prepared and the mixture was heated to 294° C. for five hours. After this heat treatment, the cooked product was cooled and diluted with an equal volume of heptane. The resulting varnish had a Gardner color of 11.

This varnish was applied to steel panels and dried at 150° C. for three hours to yield an excellent varnish coating. The varnish coating film was very flexible, had an excellent adhesion to the panel, a good light stability and an excellent water resistance.

*Example 3.*—A portion of cut No. 4 from the above distillation table was mixed in the proportion of 800 parts by volume with 50 parts by volume of di-isobutylene and 1000 parts by volume of methyl chloride, the mixture being prepared in a polymerizer equipped with a propeller stirrer and a strongly cooled reflux condenser. To this strongly stirred mixture there was then added 540 parts by volume of a solution of aluminum chloride in ethyl chloride having a concentration of approximately 4.4%. The catalyst was added rather slowly over a time interval of approximately 2 hours and during this time the temperature of polymerization was held by the cold reflux at approximately −12° C. When the catalyst was all added, the solution was poured into water at room temperature to wash out as much as possible of the catalyst and to volatilize out the ethyl and methyl chloride. The resulting resin was then separated from the water and heated to 200° C. for approximately ½ hour to remove as much as possible of residual traces of alkyl halides and as much as possible of the di-isobutylene, as well as saturates and other material from the original cut.

The resulting resin was solid at room temperature, showed a Gardner color of 8, a Staudinger molecular weight number of 4000, an iodine number of 110, and a melting point by the ring and ball method of 82° C.

This resin also was dissolved in oil, in this instance a mixture of 9 parts China-wood oil, one part castor oil, and 90 parts linseed oil in a proportion to yield a "15 gallon length" and the resulting mixture was heated at 293° C. for three hours. The resulting varnish had a Gardner color of 10 and was found to be an excellent varnish and paint base in every respect.

Thus, the process of the invention selectively distills a poly-olefinic component, substantially free from aromatics, from a cracking coil, compression residue and copolymerizes it with a mono-olefin at a low temperature to yield a valuable resin suitable for molding compositions, paint, varnish, and enamel bases, etc.

While there are above disclosed but a limited number of embodiments of the process and product of the present invention, it is possible to provide still other embodiments without departing from the inventive concept herein disclosed, and it is therefore desired that only such limitations be imposed upon the appended claims as are stated therein or required by the prior art.

The invention claimed is:

1. In a polymerization process for producing a solid resin suitable for use in coating compositions which comprises using an olefin containing fraction obtained from a compression condensate produced from crude petroleum cracked at approximately 1300° F. for the production of gasoline boiling range hydrocarbons, including the steps of compressing gaseous material from the cracking step, cooling the compressed material to room temperature, separating from the compressed gases a liquid condensate having a specific gravity of not more than 0.860, an initial boiling point at atmospheric pressure of approximately 40° C. and a final boiling point of approximately 180° C., and a bromine number within the range of approximately 1,000 to 1,100 mgs. per cc., the steps of fractionally distilling the said compression condensate into cuts, segregating the olefin-containing cut boiling between 20° C. to 50° C. and the olefin-containing cut boiling between 125° C. to 185° C. at atmospheric pressure, both of said cuts being substantially free of aromatic materials, admixing about 40% to 95% of olefin-containing material selected from the group consisting of the two said aromatic-free cuts and mixtures thereof, with about from 60% to 5% of diisobutylene, and copolymerizing said mixture of olefins at a temperature within the range between about +10° C. to about −30° C. in the presence of a dissolved Friedel-Crafts catalyst, whereby there is obtained a light-colored, relatively gel-free copolymer resin.

2. In a polymerization process for producing a solid resin suitable for use in coating compositions which comprises using an olefin-containing cut obtained from a compression condensate produced from crude petroleum cracked at approximately 1300° F. for the production of gasoline boiling range hydrocarbons, including the steps of compressing gaseous material from the cracking step, cooling the compressed material to room temperature, separating from the compressed gases a liquid condensate having a specific gravity of not more than 0.860, an initial boiling point at atmospheric pressure of approximately 40° C. and a final boiling point of approximately 180° C., and a bromine number within the range of approximately 1,000 to 1,100 mgs. per cc., the steps of fractionally distilling the said compression condensate into cuts, segregating the olefin-containing cut boiling between 20° C. to 50° C. at atmospheric pressure, said olefin-containing cut being substantially free of aromatic materials, admixing about 550 parts by weight of aromatic-free olefin-containing cut with about 200 parts by weight of diisobutylene and copolymerizing said mixture of olefins in the presence of 430 parts by weight of a catalyst solution consisting of a 3.5 per cent by weight solution of aluminum chloride dissolved in ethyl chloride, at a temperature of about −25° C., obtained by the addition of about 700 parts by weight of liquid propane, whereby there is obtained a light-colored, relatively gel-free copolymer resin.

3. In a polymerization process for producing a solid resin suitable for use in coating compositions which comprises using an olefin-containing fraction obtained from a compression condensate produced from crude petroleum cracked at approximately 1300° F. for the production of gasoline boiling range hydrocarbons, including the steps of compressing gaseous material from the cracking step, cooling the compressed material to room temperature, separating from the compressed gases a liquid condensate having a specific gravity of not more than 0.860, an initial boiling point at atmospheric pressure of approximately 40° C. and a final boiling point of approximately 180° C., and a bromine number within the range of approximately 1,000 to 1,100 mgs. per cc., the steps of fractionally distilling the said compression condensate into cuts, segregating the olefin-containing cut boiling between 125° C. to 185° C. at atmospheric pressure, said olefin-containing cut being substantially free of aromatic materials, admixing about 800 parts by volume of said aromatic-free olefin-containing cut with about 50 parts by volume of diisobutylene, and copolymerizing said mixture of olefins in the presence of 540 parts by volume of a catalyst solution consisting of a 4.4 per cent by weight solution of aluminum chloride dissolved in ethyl chloride, at a temperature of about −12° C., obtained by the addition of about 1,000 parts by volume of methyl chloride, whereby there is obtained a light-colored, relatively gel-free copolymer resin.

JOHN D. GARBER.
WILLIAM J. SPARKS.
DAVID W. YOUNG.

REFERENCES CITED

The following references are of record in the file of this patent:

UNITED STATES PATENTS

| Number | Name | Date |
|---|---|---|
| 1,982,708 | Thomas | Dec. 4, 1934 |
| 2,092,295 | van Peski | Sept. 7, 1937 |
| 2,122,826 | Van Peski | July 5, 1938 |
| 2,271,636 | Frolich | Feb. 3, 1942 |
| 2,476,000 | Sparks et al. | July 12, 1949 |